(12) United States Patent
Labrie

(10) Patent No.: US 9,366,342 B2
(45) Date of Patent: Jun. 14, 2016

(54) POPPET VALVE WITH LINEAR AREA GAIN

(75) Inventor: Jason Labrie, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1766 days.

(21) Appl. No.: 12/704,559

(22) Filed: Feb. 12, 2010

(65) Prior Publication Data

US 2011/0197627 A1  Aug. 18, 2011

(51) Int. Cl.
*F25B 41/06* (2006.01)
*F16K 1/54* (2006.01)
*F16K 1/36* (2006.01)

(52) U.S. Cl.
CPC .... *F16K 1/54* (2013.01); *F16K 1/36* (2013.01)

(58) Field of Classification Search
CPC ............... F16K 1/54; F16K 1/36; F16K 1/38; F25D 31/00
USPC ............ 251/129.11, 129.12, 129.13; 62/527, 62/528, 511
See application file for complete search history.

(56) References Cited

U.S. PATENT DOCUMENTS

| | | | |
|---|---|---|---|
| 3,435,850 A | 4/1969 | Male | |
| 4,346,577 A | 8/1982 | Peters et al. | |
| 4,506,518 A * | 3/1985 | Yoshikawa et al. | 62/180 |
| 4,593,881 A * | 6/1986 | Yoshino | 251/124 |
| 4,976,404 A * | 12/1990 | Ichikawa et al. | 251/121 |
| 6,583,525 B2 | 6/2003 | Dyer et al. | |
| 6,682,016 B1 | 1/2004 | Peroulakis | |
| 6,789,562 B2 | 9/2004 | Dyer et al. | |
| 6,886,665 B2 | 5/2005 | Parsons et al. | |
| 6,926,490 B2 | 8/2005 | McAuliffe et al. | |
| 6,991,212 B2 * | 1/2006 | Casar et al. | 251/122 |
| 7,080,591 B2 | 7/2006 | Doherty | |
| 7,159,614 B2 | 1/2007 | Tiziani et al. | |
| 7,584,782 B1 | 9/2009 | Bizzarro | |
| 7,624,929 B2 | 12/2009 | Sohn et al. | |
| 7,640,846 B2 | 1/2010 | Williamson et al. | |
| 2006/0180781 A1 * | 8/2006 | Winter | 251/129.11 |

FOREIGN PATENT DOCUMENTS

| | | |
|---|---|---|
| EP | 0301578 | 2/1989 |
| GB | 749829 | 6/1956 |
| GB | 1011820 | 12/1965 |
| JP | 59047568 | 3/1984 |

OTHER PUBLICATIONS

Extended European Search Report Dated May 19, 2011.

* cited by examiner

*Primary Examiner* — Jonathan Bradford
*Assistant Examiner* — Elizabeth Martin
(74) *Attorney, Agent, or Firm* — Carlson, Gaskey & Olds, PC

(57) ABSTRACT

A poppet valve has a valve pin movable relative to a bore, and with a curved outside shape. A flow cross-sectional area across the poppet valve is defined between an outer diameter of the curved outside shape, and an inner diameter of the bore. Further, a vapor cycle incorporating such a poppet valve is also described.

9 Claims, 3 Drawing Sheets

POPPET VALVE WITH LINEAR AREA GAIN

BACKGROUND OF THE INVENTION

This application relates to a poppet valve wherein a flow cross-sectional area varies linearly with movement of the valve.

Valves are utilized in any number of applications. In one particular application, valves are utilized as an expansion device in a refrigerant cycle, such as a vapor cycle. Essentially, a fluid is compressed, then passed through a first heat exchanger. Fluid downstream of this heat exchanger passes through an expansion device at which the fluid flow is restricted such that the fluid expands across the restriction. This expanded fluid then passes through another heat exchanger before returning to the compressor.

Some expansion device valves have used poppet valves having a conical valve pin movable relative to a valve seat. As the conical valve pin moves, a flow cross-sectional area changes. The flow cross-sectional area is defined by the valve pin outer diameter, and a valve seat orifice inner diameter. As a conical valve pin strokes, the inner radius varies linearly. However, because the area of a circle is a function of the radius squared, the area does not vary linearly with linear valve poppet movement.

Controls for the position of a conical pin must be programmed to achieve a desired flow cross-sectional area with the ability to calculate the constantly varying movement. This requires precise, complex positioning of the valve pin.

SUMMARY OF THE INVENTION

A poppet valve has a valve pin movable relative to a bore, and with a curved outside shape. A flow cross-sectional area across the poppet valve is defined between an outer diameter of the curved outside shape, and an inner diameter of the bore.

Further, a vapor cycle incorporating such a poppet valve is disclosed and claimed.

These and other features of the present invention can be best understood from the following specification and drawings, the following of which is a brief description.

DETAILED DESCRIPTION OF THE PREFERRED EMBODIMENT

Figure 1:
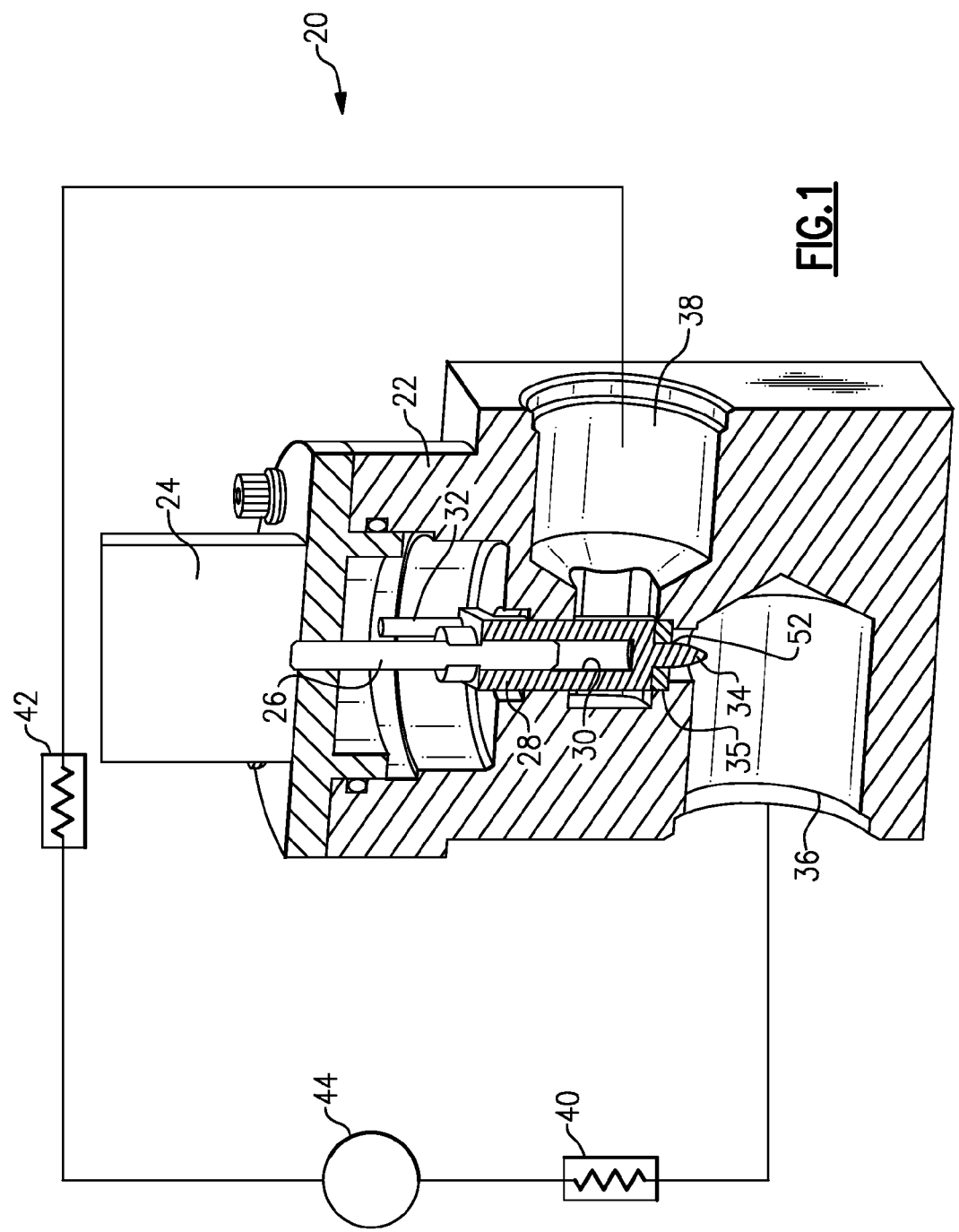
FIG. 1 schematically shows a vapor cycle incorporating an inventive valve.

A vapor cycle 20 is illustrated in FIG. 1. An expansion device is provided by a poppet valve 22 having a rotary step motor 24. The rotary step motor 24 drives a shaft 26. Shaft 26 is received within a valve pin 28. Valve pin 28 is constrained from rotation by a finger 32, and is thus caused to move linearly upon rotation of the shaft 26. The detail for achieving this rotary to linear transmission may be as known in the art. Essentially, the shaft 26 may be received within a bore 30 in the valve pin 28. The valve pin 28 includes a head 34 which has an outer parabolic shape. The head area 34 moves within a bore 52 in a valve seat 35. Fluid may enter the expansion device 22 from an inlet 38, pass across a restriction defined between the head 34 and the bore 52 of the valve seat 35, and then pass to an outlet 36. The fluid is expanded while crossing this restricted area.

As shown, the vapor cycle 20 may include a compressor 44 delivering a compressed refrigerant to a first heat exchanger 42. Downstream of the heat exchanger 42, the refrigerant passes through the poppet valve 22, the inlet 38, to the outlet 36, and to a second heat exchanger 40. Downstream of the second heat exchanger 40, the refrigerant returns to the compressor 44. While a simple vapor cycle having two heat exchangers is shown, in practice, many more heat exchangers and other refrigerant system components could be included into the system.

Figure 2:
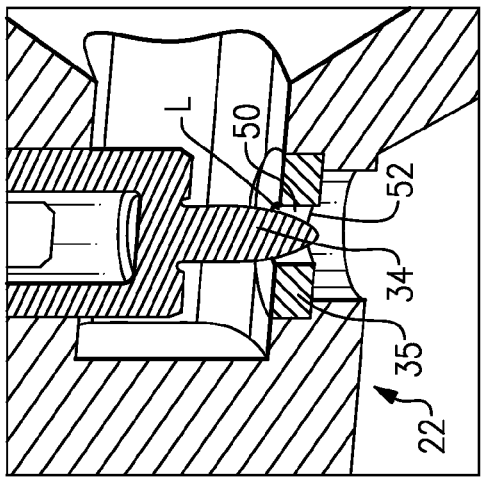
FIG. 2 shows the valve in a closed position.

FIG. 2 shows the poppet valve 22 in a closed position at which there is no flow cross-sectional area. In the FIG. 2 position, the head 34 of the valve pin 28 sits fully in the valve seat 35, blocking flow through the bore 52.

Figure 3:
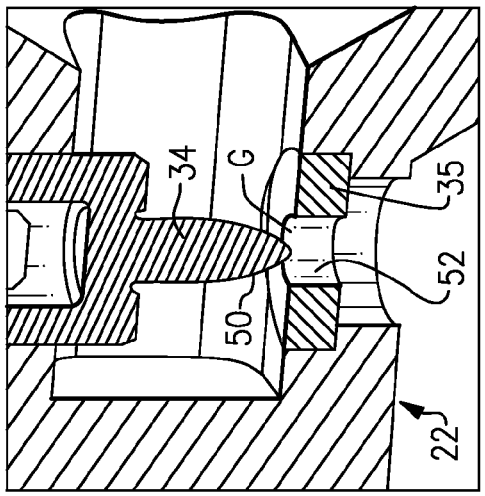
FIG. 3 shows the valve in a mid-stroke position.

FIG. 3 shows the poppet valve 22 in a mid-stroke position at which there is a limited flow cross-sectional area L, and thus restriction as the fluid crosses between the outer diameter of the head 34, and the inner diameter of bore 52. As shown, the parabolic shape 50 of the valve pin 28 defines a changing cross-sectional area. The cross-sectional area is defined at the smallest area, and thus typically at the upper surface of the valve seat 35 as shown in this position.

Figure 4:
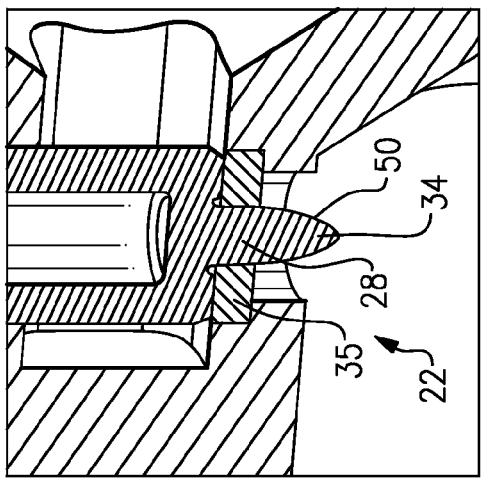
FIG. 4 shows the valve in an open position.

FIG. 4 shows the poppet valve 22 generally open, and not restricting fluid flow. In the FIG. 4 position, the valve pin 28 is retracted from the valve seat 35, and generally has little or no restriction on the flow of fluid through the bore 52. The flow cross-sectional area G is now greater than at the FIG. 3 position.

Figure 5:
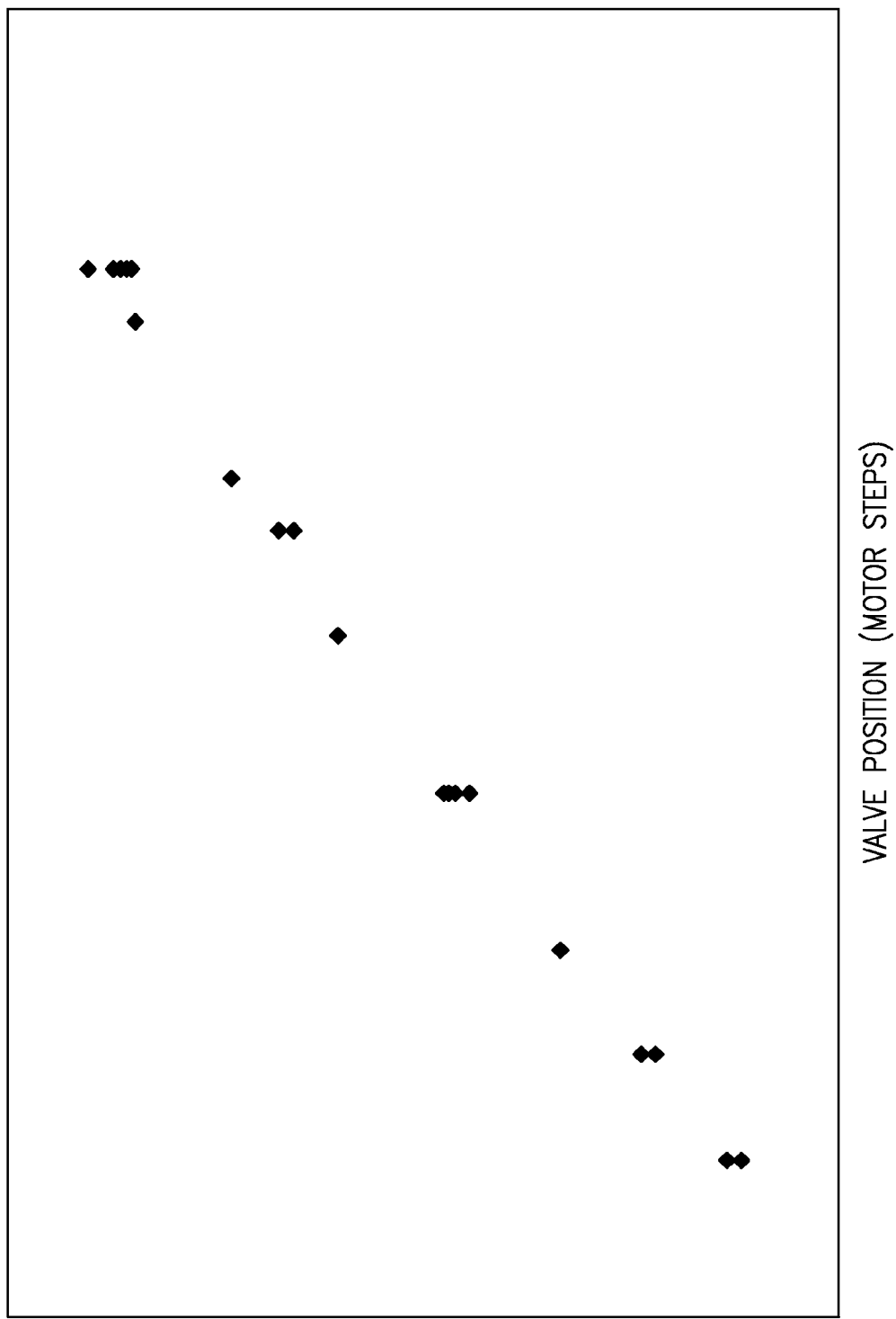
FIG. 5 shows the linear changing of an effective valve flow area with valve positioning.

FIG. 5 is a graph showing the change in the effective flow area with changing valve position. As shown, this change is generally linear due to the parabolic outer shape of the valve pin 28.

Figure 6:
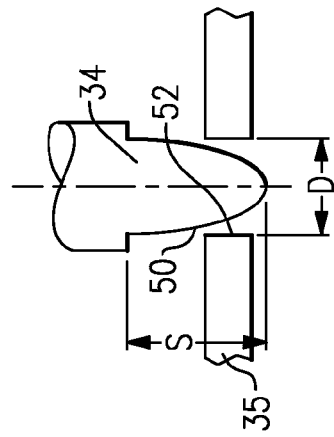
FIG. 6 shows how the shape of the valve pin may be calculated to achieve desired flow characteristics.

FIG. 6 shows the outer periphery of the head 34, and the inner bore 52 in the valve seat 35. As shown, an orifice diameter D of the orifice 52 can be defined, and a valve stroke S is also defined.

The desired shape for the parabolic curve 50 is defined by the standard parabolic equation form:

$$y = ax^2 + bx + c \qquad \text{Equation 1}$$

c=valve stroke
b=shifts along x axis
b=0
a affects the "width" of parabola
To determine "a":

$$bx = 0 \text{ as } b = 0$$

$$y = ax^2 + bx + c$$

$$0 = ax^2 + (-\text{valve stroke})$$

$$0 = a(\tfrac{1}{2} \text{ orifice Dia})^2 + (-\text{valve stroke})$$

$$a(\tfrac{1}{2} \text{ orifice Dia})^2 = (\text{valve stroke}) \qquad \text{Equation 2}$$

$$a = \frac{(\text{valve stroke})}{(1/2 \text{ orifice } Dia)^2}$$

$$y = \frac{(\text{valve stroke})}{(1/2 \text{ orifice } Dia)^2} x^2 + (-\text{valve stroke})$$

With the above calculations, one can define a desired parabolic shape for a valve pin that is particularly useful in a poppet valve such that a linear change in cross-sectional area can be achieved. In this manner, very simple drive transmissions can be utilized to achieve a desired flow cross-sectional area as necessary for a refrigerant circuit, or for some other application. In the prior art, since the flow cross-sectional area did not change linearly, one needed a more complex drive arrangement, as a simple step motor would not necessarily be able to easily provide a desired location.

While a parabolic shape is described in the preferred embodiments, the invention would extend to a valve pin having a head with a curved outer surface such that the flow cross-sectional area changed would be approximately linear, or closer to linear than the conical prior art valve pin heads.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A poppet valve comprising:
   a valve pin movable relative to a bore, and having a head with a curved outside shape, with a flow cross-sectional area across said poppet valve being defined between an outer diameter of said curved outside shape, and an inner diameter of said bore; and
   said curved outside shape is a parabolic shape.

2. The poppet valve as set forth in claim 1, wherein a step motor causes said valve pin to be movable relative to said bore.

3. The poppet valve as set forth in claim 1, wherein said parabolic shape is determined based upon a function of both the inner diameter of said bore and a stroke of said valve pin.

4. The poppet valve as set forth in claim 3, wherein a formula is utilized to determine the parabolic shape, where "y" is a position of the valve pin along a (y) axis, and "x" is a corresponding radius of an inner portion of a flow annulus and orifice Dia is the inner diameter of said bore diameter:

$$y = \frac{\text{(valve stroke)}}{(1/2 \text{ orifice } Dia)^2} x^2 + (-\text{valve stroke}).$$

5. The poppet valve as set forth in claim 4, wherein a step motor causes said valve pin to be movable relative to said bore.

6. A refrigerant cycle comprising:
   a compressor delivering refrigerant to a first heat exchanger, and from the first heat exchanger passing across an expansion device, refrigerant downstream of the expansion device passing to a second heat exchanger, and then back to said compressor, and said expansion device including a restriction defined by a poppet valve, the poppet valve including a valve pin movable relative to a bore, and having a head with a curved outside shape, with a flow cross-sectional area across said poppet valve being defined between an outer diameter of said curved outside shape, and an inner diameter of said bore;
   a step motor causing said valve pin to be movable relative to said bore; and
   said curved outside shape being a parabolic shape.

7. The refrigerant cycle as set forth in claim 6, wherein said parabolic shape is determined based upon a function of both the inner diameter of said bore and a stroke of said valve pin.

8. The refrigerant cycle as set forth in claim 7, wherein a formula is utilized to determine the parabolic shape, where "y" is a position of the valve pin along a (y) axis, and "x" is a corresponding radius of an inner portion of a flow annulus and orifice Dia is the inner diameter of said bore diameter:

$$y = \frac{\text{(valve stroke)}}{(1/2 \text{ orifice } Dia)^2} x^2 + (-\text{valve stroke}).$$

9. The refrigerant cycle as set forth in claim 8, wherein a step motor causes said valve pin to be movable relative to said bore.

* * * * *